March 13, 1951 G. A. LYON 2,544,705
WHEEL COVER
Filed Dec. 12, 1947
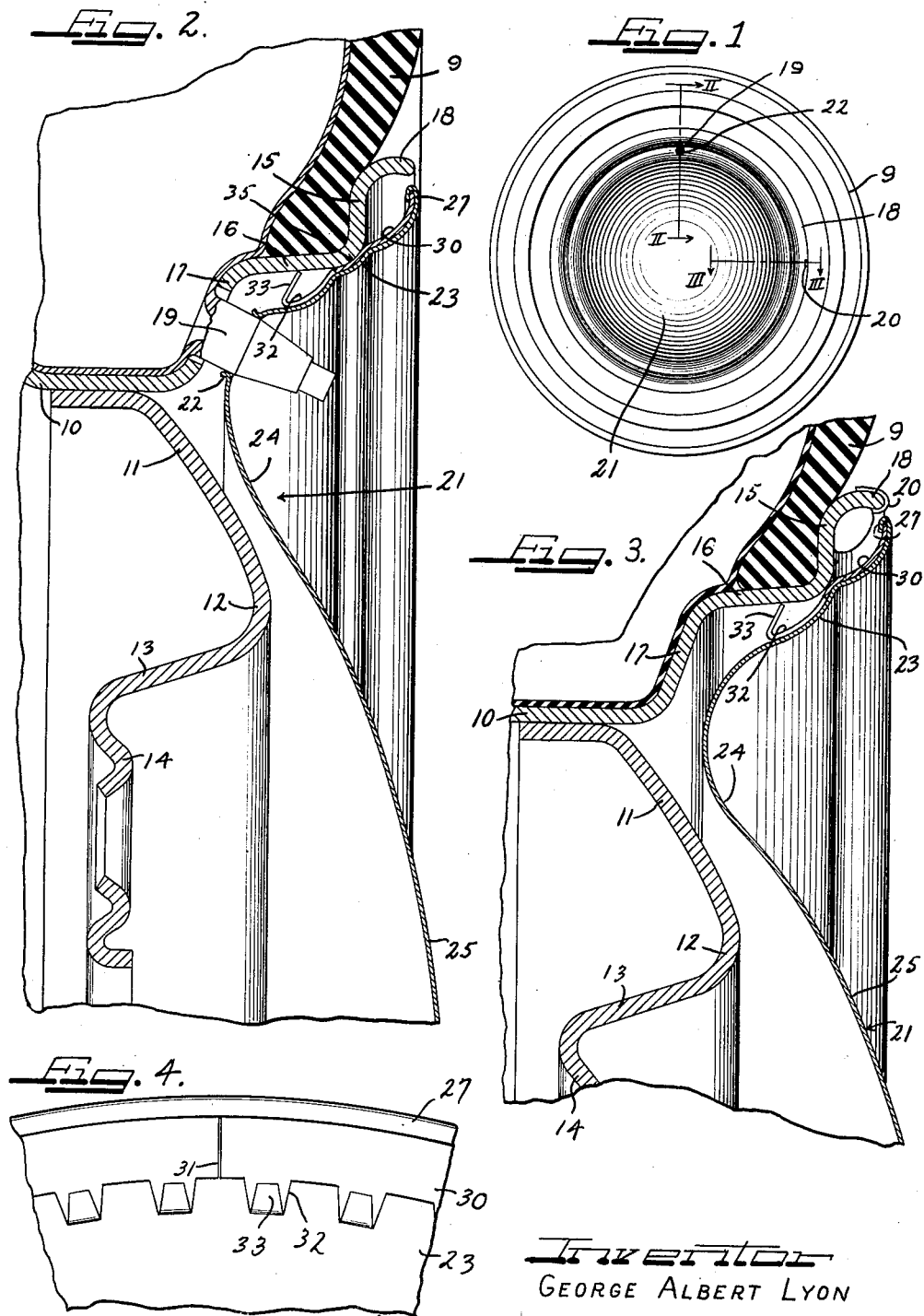
Inventor
GEORGE ALBERT LYON
By The Firm of Charles W. Hills
Attys.

Patented Mar. 13, 1951

2,544,705

UNITED STATES PATENT OFFICE 2,544,705

WHEEL COVER

George Albert Lyon, Detroit, Mich.

Application December 12, 1947, Serial No. 791,315

7 Claims. (Cl. 301—37)

This invention relates to ornamental trim for wheels, and more particularly to an ornamental cover for an automobile wheel.

An object of this invention is to provide an ornamental wheel cover with improved means for detachably retaining the cover on a wheel.

Another object of this invention is to provide a two-piece wheel cover, one of which comprises a stamping and the other of which comprises a rolled ring formed to serve as a retaining means for the cover proper.

Yet another object of this invention is to provide a cover with retaining means which will not only reinforce the cover, but, in addition, will assist in centering the cover on the wheel.

Yet another object of this invention is to provide a wheel cover which may be applied to the conventional automobile wheel and yet afford clearance for the accommodation of the usual wheel balancing weight between a tire rim flange and the cover.

In accordance with the general features of this invention there is provided in a wheel structure, including a wheel having a multi-flanged and shouldered drop center tire rim part and a wheel body part, a circular cover for disposition over an outer side of the wheel and having an outer edge portion spaced from an outer flange of the rim part, and means connected to the outer margin of the cover for detachably connecting the cover to a flange of the rim part comprising a ring nested in the outer margin of the cover and bottomed against a shoulder of the rim part between the flanges of the rim part for centering the cover on the wheel.

Other features of the invention relate to the manner in which the aforesaid retaining ring is fastened to the cover, as well as to the formation of retaining fingers on the ring and the manner in which they cooperate with the tire rim part.

Other objects and features of this invention will more fully appear from the following detailed description taken in connection with the accompanying drawings which illustrate a single embodiment thereof and in which Figure 1 is a side view of an automobile wheel structure having applied thereto a cover embracing the features of this invention.

Figure 2 is an enlarged fragmentary cross-sectional view taken on the line II—II of Figure 1, looking in the direction indicated by the arrows.

Figure 3 is an enlarged fragmentary cross-sectional view similar to Figure 2, but taken on the line III—III of Figure 1 looking in the direction indicated by the arrows and showing a balancing weight applied to the rim part of the wheel; and Figure 4 is a fragmentary rear view of a portion of the outer margin of the cover showing how the split cover retaining ring is interlocked with the cover proper.

As shown on the drawings:

In the accompanying drawings, I have illustrated my novel cover as being applied to a conventional drop center type of automobile wheel. Also, while I have shown the cover as being in the form of a full disk, it is, of course, clear that the center portion of the disk could be omitted or made detachable in a manner well known in the prior patented art.

The reference character 9 designates generally a conventional pneumatic tire and tube assembly mounted on a conventional drop center type of tire rim carried by a dished or stamped body part 11. This body part 11 may be bolted in the usual way on a vehicle axle, and includes a central dished portion 12, an inclined central flange 13 and a bolt-on flange 14. It is the aim of this invention to provide a wheel cover for substantially concealing the exposed flanges of the rim and body parts 10 and 11.

The rim part 10 includes the usual flanges 15, 16 and 17, as well as an outer turned edge 18 in close proximity to the side wall of the tire assembly 9. Also the tire and tube assembly 9 includes the customary valve stem 19 which, in this case by reason of the dished configuration of the cover to be hereinafter described, can be utilized to a certain extent in assisting in centering the cover.

It should be noted that the outer edge 18 of the tire rim is adapted to be engaged by a conventional snap-on counterbalancing wheel weight 20, which as is well known in the art, has a spring clip for holding it on the edge of the rim. It may be adjustably applied to the rim in accordance with the demands of the wheel with reference to the counterbalancing of the same. For illustration, it may be disposed opposite the valve stem so as to offset the unbalancing of the wheel by reason of the valve stem.

The cover of my invention is designated generally by the reference character 21, and is of a circular or disk-like configuration. In reality it is dished thereby providing divergent portions 23 and 24, which have their junction adjacent the area of the valve stem. The junction of these portions 23 and 24 is provided with an opening 22 through which the valve stem extends so that the stem can in this manner assist, to a certain extent, in the centering of the cover on the wheel.

The outer edge of the cover is turned at 27 so as to hold in place on the back of the cover a retaining ring designated generally by the reference character 30. This retaining ring as distinguished from the cover disk proper may comprise a rolled section whereas the cover may be made from stamping.

One of the features of this invention is the utilization of the turned edge 27 to hold the split ring 30 in circular shape without the necessity of welding the ends together at 31 (Figure 4).

It will be noted from Figures 2 and 3 that the ring 30 is of a stepped cross section corresponding to the stepped configuration of the outer margin of the cover 21 whereby it is snugly nested in the outer margin. It is also clear from Figures 2 and 3 that the outer turned edge 27 of the cover is normally spaced from the outer flange 15 whereby clearance is provided for the accommodation of the wheel weight 20.

The inner edge of the retaining ring 30 is serrated and provided with a plurality of resilient fingers backed up by the main body of the disk but slightly spaced therefrom in the unmounted condition of the cover so as to be yieldable. Each of these fingers 32 includes a radially axially outwardly inclined tooth-like portion 33 for retaining engagement with the surface of the flange 16. In such engagement the body portions of the fingers are flexed to substantially take up the original space between the fingers and the body of the cover disk.

Attention is directed to the fact that an intermediate portion of the ring 30 nested in the outer margin of the cover is adapted to bear at 35 on a shoulder of the tire rim between the flanges 15 and 16. This is advantageous in that it enables the shoulder to assist in centering the cover as well as to serve as a stop for limiting the inward movement of the cover when it is pushed home into retaining cooperation with the tire rim. This intermediate portion may be slightly curved, as shown, so that it will fit around the curved surface of the rim shoulder at 35.

The cover member 20 may be made from any suitable steel sheet material, such, for example, as cold rolled steel or stainless steel, and polished or buffed or otherwise finished. The retaining ring 30 may be rolled from strip stock on suitable rolling equipment and is easily attachable to the rear side of the cover by a simple press operation necessary in turning the edge 27.

I also desire to point out that another advantage of the bearing of the cover at 35 on the rim resides in the fact that it tends to minimize the possibility of stones, dirt and pebbles getting behind the cover disk.

In applying the cover the hole 22 is first aligned with the valve stem and then the cover is pressed axially home until it is bottomed at 35. During this movement of the cover, the teeth 33 slide under tension over the surface of the flange 16 and then grip the rim surface. Any tendency to accidentally displace the disk results in an enhancement of the gripping engagement.

However, the cover may be easily removed by applying a pry-off tool to the reinforced turned edge 27 and thereby ejecting the cover from the wheel. In this operation the teeth 33 are caused to progressively yield radially inwardly thereby releasing their grip on the flange 16.

I claim as my invention:

1. In a wheel structure including a wheel having a multi-flanged and shouldered drop center tire rim part and a wheel body part, a circular cover for disposition over an outer side of the wheel and having an outer margin spaced axially outwardly from an outer flange of the rim part to provide clearance for the accommodation of a wheel balancing weight behind said edge and on the rim part, and means connected to the outer margin of the cover for detachably fastening the cover to a flange of the rim part comprising a ring nested in the outer margin of the cover and bottomed against a shoulder of the rim part between flanges of the rim part for centering the cover on the wheel.

2. In a wheel structure including a wheel having a multi-flanged and shouldered drop center tire rim part and a wheel body part, a circular cover for disposition over an outer side of the wheel and having an outer margin spaced axially outwardly from an outer flange of the rim part to provide clearance for the accommodation of a wheel balancing weight behind said edge and on the rim part, and means connected to the outer margin of the cover for detachably fastening the cover to a flange of the rim part comprising a ring nested in the outer margin of the cover and bottomed against a shoulder of the rim part between flanges of the rim part for centering the cover on the wheel, the outer margin of said cover being stepped and the ring being similarly stepped so as to nestingly fit in the steps of said margin.

3. In a wheel structure including a wheel having a multi-flanged and shouldered drop center tire rim part and a wheel body part, a circular cover for disposition over an outer side of the wheel and having an outer margin spaced axially outwardly from an outer flange of the rim part to provide clearance for the accommodation of a wheel balancing weight behind said edge and on the rim part, and means connected to the outer margin of the cover for detachably fastening the cover to a flange of the rim part comprising a ring nested in the outer margin of the cover and bottomed against a shoulder of the rim part between flanges of the rim part for centering the cover on the wheel, said ring having radially and axially outwardly inclined fingers backed up by the cover and retainingly cooperable with a flange of the rim part axially inwardly of said shoulder on which the cover is centered.

4. In a wheel structure including a wheel having a multi-flanged and shouldered drop center tire rim part and a wheel body part, a circular cover for disposition over an outer side of the wheel and having an outer edge spaced axially outwardly from an outer flange of the rim part and means connected to the outer margin of the cover for detachably fastening the cover to a flange of the rim part comprising a ring nested in the outer margin of the cover and bottomed against a shoulder of the rim part between flanges of the rim part for centering the cover on the wheel, said ring on one side of said shoulder diverging from the shoulder and being interlocked with the cover and on the other side of said shoulder diverging from the shoulder and being formed into inclined fingers for detachably retaining cooperation with a flange of the rim part axially rearwardly from the shoulder.

5. In a wheel structure including a wheel having a multi-flanged and shouldered drop center tire rim part and a wheel body part, a circular cover for disposition over an outer side of the wheel and having an outer margin provided with a plurality of stepped portions and means connected to the outer margin of the cover for detachably connecting the cover to a flange of the rim part comprising a ring having stepped portions complementary to that of the margin of the cover so as to snugly nest in the rear side of the stepped portions, said ring having resilient fingers for detachably gripping a flange of the rim and having one of its stepped portions curved to fit around a shoulder on the rim to assist in centering the cover and to serve as a stop in limiting axial movement of the cover against the wheel.

6. In a wheel structure including a wheel having a multi-flanged and shouldered drop center tire rim part and a wheel body part, a circular cover for disposition over an outer side of the wheel and having an outer margin provided with a plurality of stepped portions and means connected to the outer margin of the cover for detachably connecting the cover to a flange of the rim part comprising a ring having stepped portions complementary to that of the margin of the cover so as to snugly nest in the rear side of the stepped portions, said ring having resilient fingers for detachably gripping a flange of the rim and having one of its stepped portions curved to fit around a shoulder on the rim to assist in centering the cover and to serve as a stop in limiting axial movement of the cover against the wheel, and said cover having its outer edge interlocked with an outer edge of the ring and the interlocked edges providing a reinforced cover pry off edge.

7. In a wheel structure including a load sustaining body part and a tire rim secured to the body part having a multi-flanged outer side including an intermediate flange and a terminal flange joined on a generally radially inwardly and axially outwardly facing shoulder, a wheel cover for substantially completely covering the wheel and comprising a one-piece metal disk having its outer margin adjacent to the extremity of the terminal flange of the tire rim but spaced axially outwardly therefrom to provide clearance therebehind for a wheel balancing weight carried by the terminal flange, said cover having means thereon for securing the same to the tire rim including a ring extending from the edge of the cover along the inner side thereof and bearing against said shoulder, said ring having radially inwardly from the shoulder retaining means retainingly engaging against said intermediate flange of the tire rim, said retaining means and said shoulder engagement of said ring being the sole contact of the cover assembly with the wheel.

GEORGE ALBERT LYON.

REFERENCES CITED

The following references are of record in the file of this patent:

UNITED STATES PATENTS

| Number | Name | Date |
| --- | --- | --- |
| Re. 19,467 | Lyon | Feb. 12, 1935 |
| 2,345,283 | Mulhern | Mar. 28, 1944 |